(12) United States Patent
Ciabatti

(10) Patent No.: US 7,647,952 B2
(45) Date of Patent: Jan. 19, 2010

(54) APPARATUS FOR AUTOMATIC DELIVERING OF PASTE FOOD PRODUCTS, PARTICULARLY ICE CREAM AND/OR YOGHOURT

(75) Inventor: Piero Ciabatti, L'Aquila (IT)

(73) Assignee: Centro Design S.A.S. di Aldo Ciabatti (IT)

( * ) Notice: Subject to any disclaimer, the term of this patent is extended or adjusted under 35 U.S.C. 154(b) by 700 days.

(21) Appl. No.: 10/559,692

(22) PCT Filed: Jun. 8, 2004

(86) PCT No.: PCT/IT2004/000334
§ 371 (c)(1),
(2), (4) Date: Dec. 5, 2005

(87) PCT Pub. No.: WO2004/107873
PCT Pub. Date: Dec. 16, 2004

(65) Prior Publication Data
US 2006/0151052 A1 Jul. 13, 2006

(30) Foreign Application Priority Data
Jun. 11, 2003 (IT) .......................... RM2003A0292

(51) Int. Cl.
*B65B 1/20* (2006.01)
(52) U.S. Cl. .......................... 141/82; 141/234; 141/283
(58) Field of Classification Search .................. 141/82, 141/100, 103, 104, 234, 268, 283, 285
See application file for complete search history.

(56) References Cited

U.S. PATENT DOCUMENTS

| 1,397,520 | A | * | 11/1921 | Howe | 141/100 |
| 2,934,872 | A | * | 5/1960 | Wise | 53/296 |
| 3,876,110 | A | * | 4/1975 | Logie | 222/80 |
| 3,994,117 | A | * | 11/1976 | Kinney | 53/77 |
| 4,628,974 | A | * | 12/1986 | Meyer | 141/129 |
| 6,089,747 | A | * | 7/2000 | Huang | 366/149 |
| 6,202,895 | B1 | * | 3/2001 | Fox | 222/144 |

* cited by examiner

*Primary Examiner*—Gregory L Huson
*Assistant Examiner*—Jason K Niesz
(74) *Attorney, Agent, or Firm*—Hedman & Costigan, P.C.; Kathleen A. Costigan

(57) ABSTRACT

The present invention relates to an apparatus for automatic delivering of paste food products, particularly ice cream and/or yoghurt, comprising a housing (4), within which a plurality of containers (3) of said paste food products are provided, each one of said containers providing means (11, 21, 22, 23) for distributing said paste food products, and refrigeration means (9) for said plurality of containers, and apparatus programming means, said apparatus being characterized in that said housing provides a rotating base (6), having at least one seat (7) supporting a tray (8) for receiving said paste food products from said plurality of containers (3), said rotating base (6) moving in such a way to place said tray (8) under one of said containers (3) according to the sequence programmed by said programming means, said distribution means (11, 21, 22, 23) delivering said paste food products within said tray (8) when it is in correspondence of the specific paste food product container (3).

16 Claims, 7 Drawing Sheets

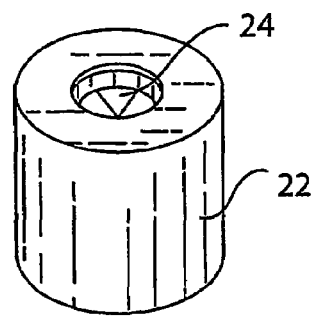
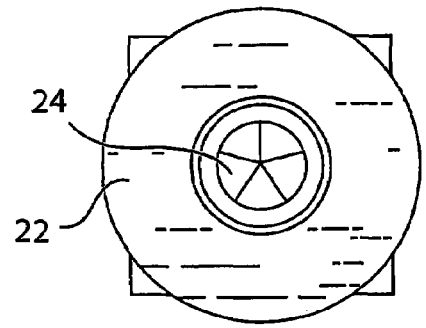
Fig. 11a  Fig. 11b
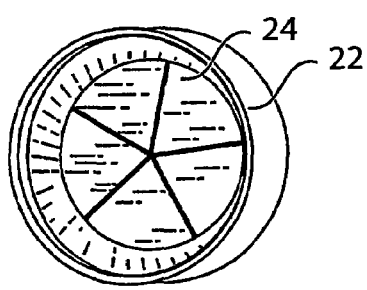
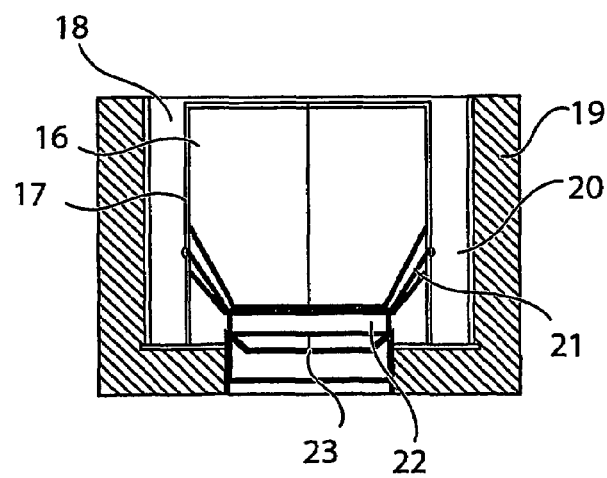
Fig. 11c  Fig. 10

APPARATUS FOR AUTOMATIC DELIVERING OF PASTE FOOD PRODUCTS, PARTICULARLY ICE CREAM AND/OR YOGHOURT

The present invention relates to an apparatus for automatic delivering of paste food products, particularly ice cream and/or yoghurt.

More specifically, the invention relates to a machine for automatic delivery of food products, allowing to maintain a high hygiene standard and product preservation level.

In the following the specification will be specifically directed to the automatic delivering of ice cream, but it is well evident that the use of the same must not be considered as limited to these specific product.

At present, ice cream or yoghurt is kept at a uniform temperature within refrigerator banks, allowing their display to the consumers. They are served and packaged by specialised personnel, preparing the ice cream cone after the choice of the tastes by the consumer. As it is well known, maintenance personnel is very expensive and therefore it would be ideal to be have means allowing to the consumer to choose the preferred ice cream without the help of personnel. This is presently possible thanks to industrially manufactured and pre-packaged ice creams, so that the consumer can accede to the refrigerator by himself, choosing the preferred product. However, in this way it is not possible to commercialise an artisan product.

At present suitable apparatuses exist allowing conservation of different ice cream tastes, and to automatically deliver the product, by the choice of the consumer. Particularly, these machines are comprised of a series of containers, wherein the ice cream tastes are contained, on each one of which compression means act, conveying the ice cream toward a single exit. The problem of this apparatus is that between the delivering of two different tastes some of the previous gusto remains on the exit nozzle, thus contaminating the following gusto.

A device solving this problem is described in the Italian Patent No IT 1,308,198. This solution provides a plurality of vertical cylindrical containers, within which ice cream or yoghurt tastes are provided. Compression means are coupled with said containers, allowing the mechanical compression of the product, from the bottom upward, and by a pipe bring the product directly on the cone to be stuffed.

However, also this apparatus has some drawbacks. As it is well known to those skilled in the art, paste mass of the ice cream, if is not kept at a low temperature, tends first to crystallize and then to ice. Thus, on the pipes connected with the cylindrical containers, ice cream residual tends first to crystallize, since the residual is far from the refrigeration source, thus inducing a decay of the quality of the product that is then delivered. Then, this ice cream residual ices, thus clogging the same pipe.

In view of the above, it is well evident the needing of having an apparatus for automatic delivering of paste food products, allowing an optimum conservation of the product at an even temperature up to the delivering, such as the apparatus according to the present invention.

Therefore, it is object of the present invention that of allowing the optimum conservation and the automatic delivering of the ice cream, allowing conservation of its properties and without the product oxidize due to its exposition to outer environment.

It is therefore specific object of the present invention an apparatus for automatic delivering of paste food products, particularly ice cream and/or yoghurt, comprising a housing, within which a plurality of containers of said paste food products are provided, each one of said containers providing means for distributing said paste food products, and refrigeration means for said plurality of containers, and apparatus programming means, said apparatus being characterised in that said housing provides a rotating base, having at least one seat supporting a tray for receiving said paste food products from said plurality of containers, said rotating base moving in such a way to place said tray under one of said containers according to the sequence programmed by said programming means, said distribution means delivering said paste food products within said tray when it is in correspondence of the specific paste food product container.

Preferably, according to the invention, said paste food product containers can be comprised of cylinders and they can be provided in a substantially vertical position.

Still according to the invention, said refrigeration means can comprise a refrigerator motor and a refrigeration coil provided inside the wall of said housing.

Further, according to the invention, said housing can provide a insulating part, comprising an interspace, that can include said refrigeration coil.

Preferably, according to the invention, said containers of said paste food products can be provided along the proximity of the edge of said container.

Furthermore, according to the invention, said apparatus can provide at least a reserve container, provided inside said housing.

Still according to the invention, said apparatus can provide at least a receiving tray distributor receiving the paste substance to be placed in at least one seat.

Still according to the invention, said apparatus can comprise at least one distributor of not cool solid products (such as cocoa, chocolate granules, pine-seeds, etc.).

Preferably, according to the invention, said seat for said tray is substantially realised in correspondence of the outer edge of said rotating base.

Always according to the invention, said tray can be a cone or a cup.

Furthermore, according to the invention, said tray is placed in correspondence of the paste product container in a position substantially decentred with respect to the outlet of the container since it is moved by pneumatic mechanical means.

Still according to the invention, said paste food products delivering means, such as ice cream and/or yoghurt, comprise a piston, a body containing said paste food products and means for delivering said paste food products, said delivering means comprising a delivery mouth, said piston compressing the mass of said paste food products toward said delivery means, and said delivery means automatically opening said delivery mouth of said paste food products and automatically closing said mouth after the end of the compression of said piston on said paste food products.

Furthermore, according to the invention, said piston can comprise an upper wall, a lower wall and a bellow provided between said upper wall and said lower wall, said lower wall pushing said paste food products downward, and said piston can comprise a tube for flow of compressed air within said bellow, preferably through said upper wall.

Always according to the invention, said housing can have a cylindrical shape comprised of insulating material.

According to the invention, said tube for flow of compressed air within said bellow passes through said housing.

Furthermore, according to the invention, said delivery means can comprise a substantially conical shaped nut and a portion delivering element, comprising said mouth, coupled at the lower base of said nut.

Still according to the invention, said mouth can provide a plurality of tabs, said tabs remaining open during the delivery of said paste food product, and retracting after the end of the pressure of said paste food products, thus closing said mouth.

In a preferred embodiment of the apparatus according to the invention, said mouth is comprised of plastic material with memory effect.

Preferably, according to the invention, said paste food product delivery means can comprise an envelope for packaging said paste food products, such as a film, preferably a polypropylene or polyethylene film.

The present invention will be now described, for illustrative but not limitative purposes, according to its preferred embodiments, with particular reference to the figures of the enclosed drawings, wherein:

FIG. 10 shows the section lateral view of the delivery means for the ice cream;

Figure 12:
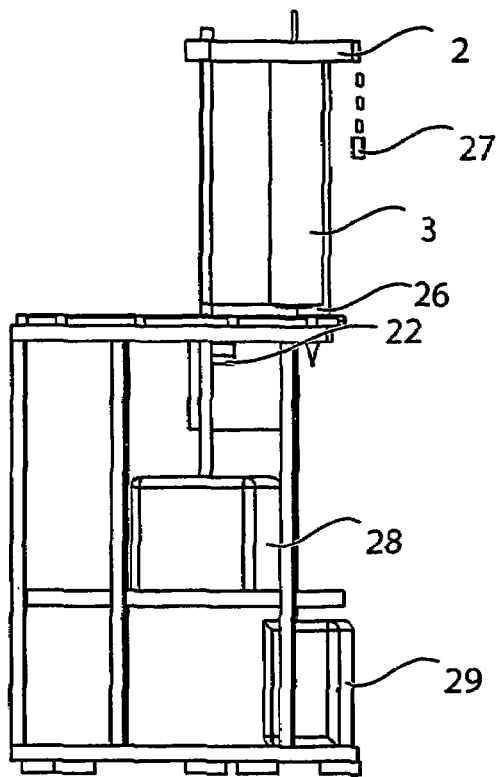
Figure 13:
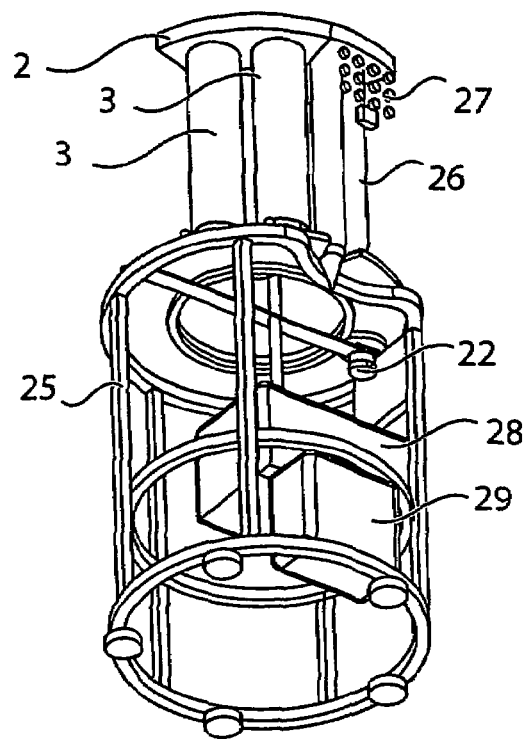
Figure 14:
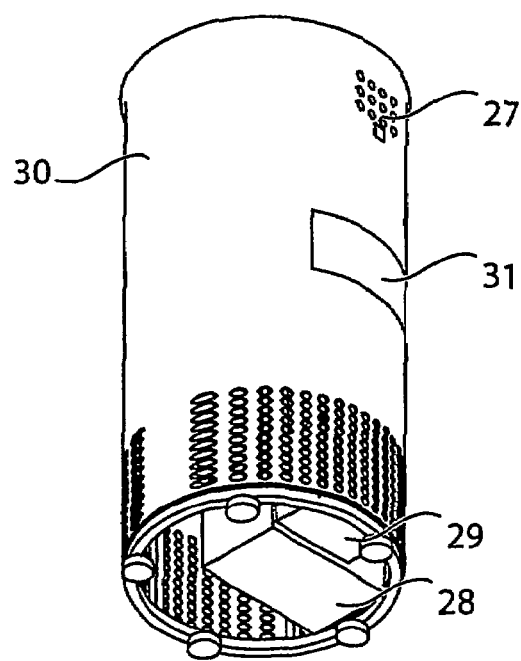

FIGS. 11a, 11b and 11c respectively show a top perspective view, a top view and a lateral perspective view of a portion delivering element; and FIGS. 12, 13 and 14 show the assembling of the various parts of the apparatus according to the invention.

To better understand the present invention, in the following it will be described the operation mode of the preferred embodiment, the same operation mode being valid for the other embodiments.

Figure 1:
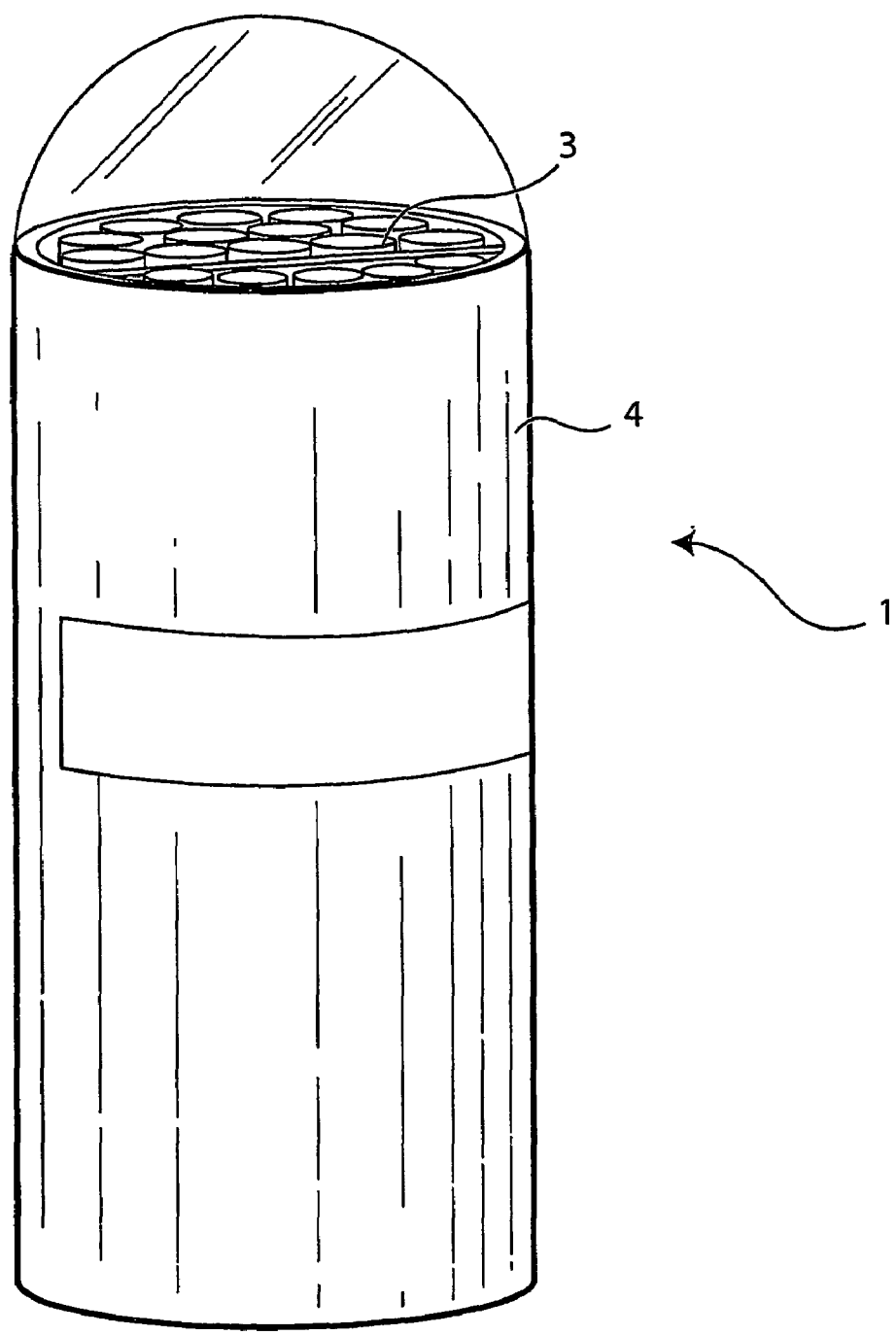
FIG. 1 shows a perspective front top view of the apparatus for the automatic delivering of paste food products according to the present invention.
Figure 2:
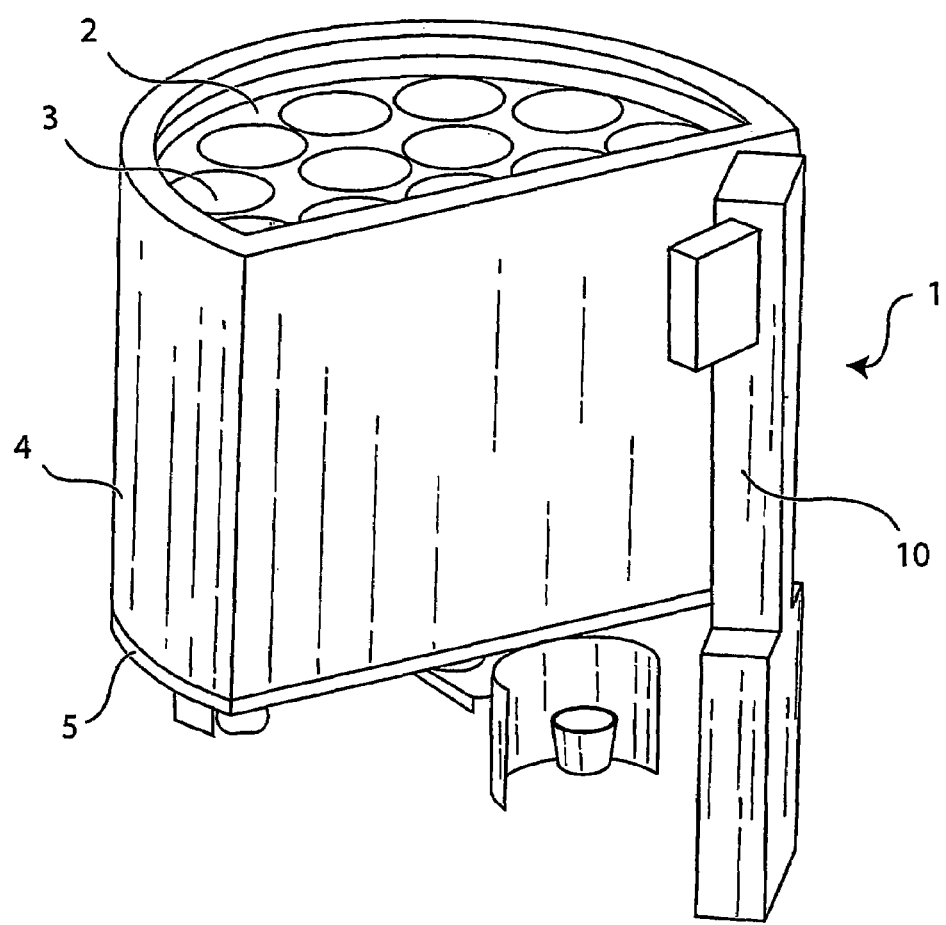
FIG. 2 shows a first perspective view, partially in section, of the apparatus of FIG. 1.
Figure 3:
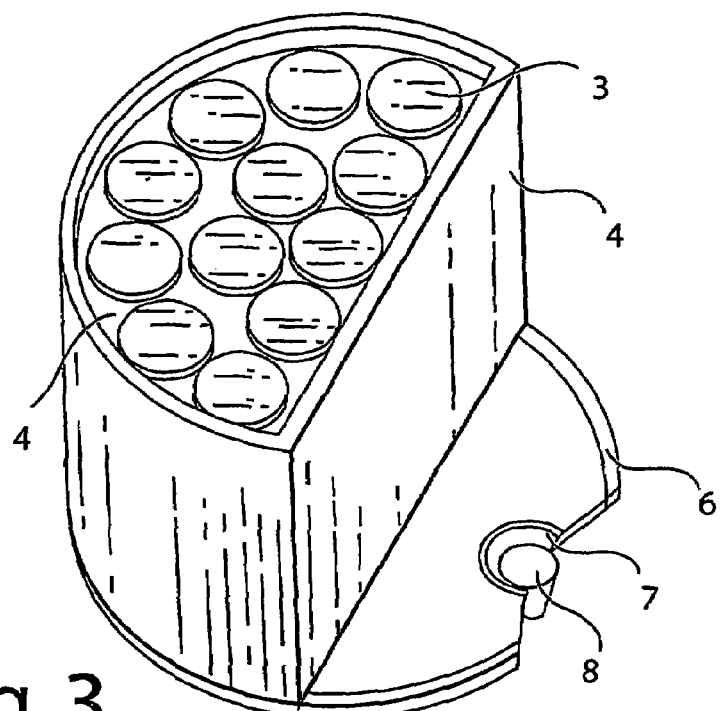
FIG. 3 shows a second perspective view, partially in section, of the apparatus of FIG. 1.
Figure 4:
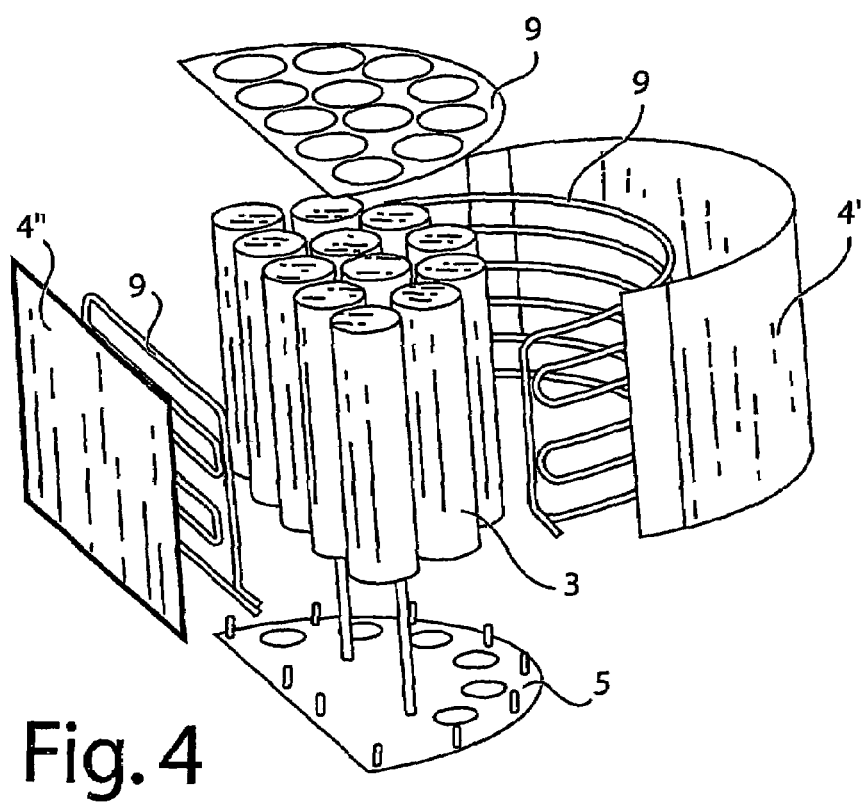
FIG. 4 shows an exploded perspective view of the apparatus of FIG. 1.

Making now reference to FIGS. 2, 3 and 4, it is possible to note the various parts of the apparatus 1 for the automatic distribution of food products. It can be clearly noted the upper panel 2 for covering the containers 3. The latters are contained within an insulating wall 4, comprised of two parts 4' and 4". At the bottom of the above insulating wall 4, a panel 5, insulating as well, is present.

A base 6 is present under the panel 5, on the edge of which a seat 7 is provided, on which the cone 8 is placed, said cone being stuffed with ice cream or yoghurt. Said base 6 can rotate with respect to its perpendicular axis, passing through its own centre. Particularly, by this rotation, it is possible to bring the cone in correspondence of the outlet of the containers 3 corresponding to the perimeter of the base. Inner containers 3 are used to preserve the reserve ice cream.

Furthermore, cone 8 in the seat 7 can rotate with respect to its own axis, in such a way that the ice cream, ejected by the cylinders, can be placed in the edges of the same cone 8, in such a way to promote an ordered positioning of the tastes.

Within the insulating wall 4 the refrigerating coil 9 is present. Said coil absorb the heat, while within the wall 4, said containers 3 are immerged within glycol.

Further, in FIG. 2 also a panel 10 is present, said panel being part of the outer frame of the apparatus, in which tubes for feeding compressed air can pass, said compressed air being supplied by a pump, not shown in the figures, within the pistons.

Figure 5:
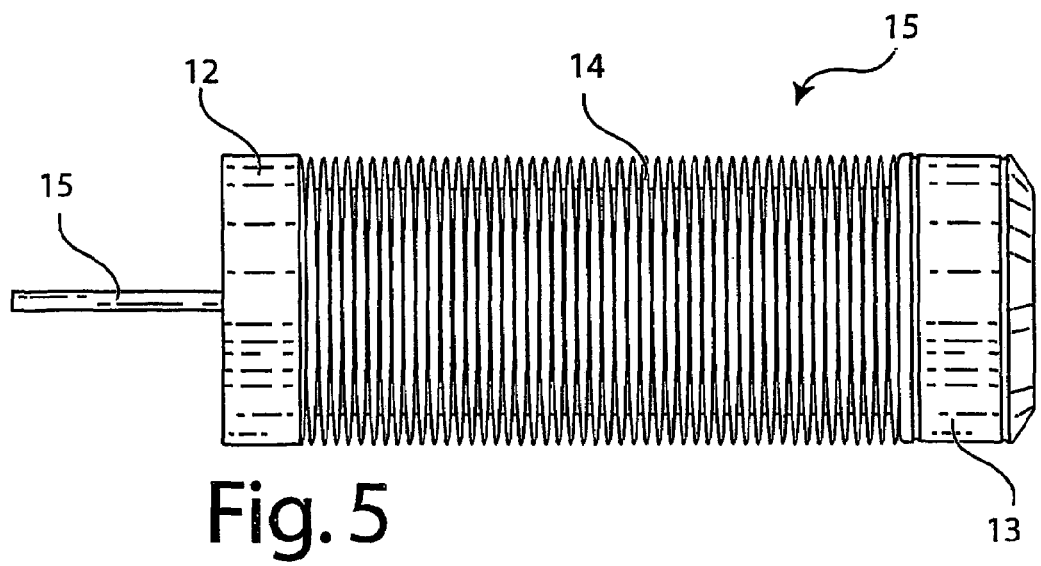
FIG. 5 shows a lateral view of a compression piston.
Figure 6:
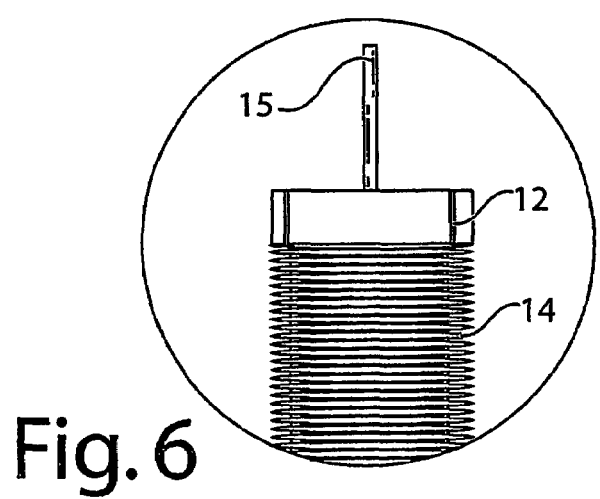
FIG. 6 shows the upper part of the compression piston of FIG. 5.
Figure 7:
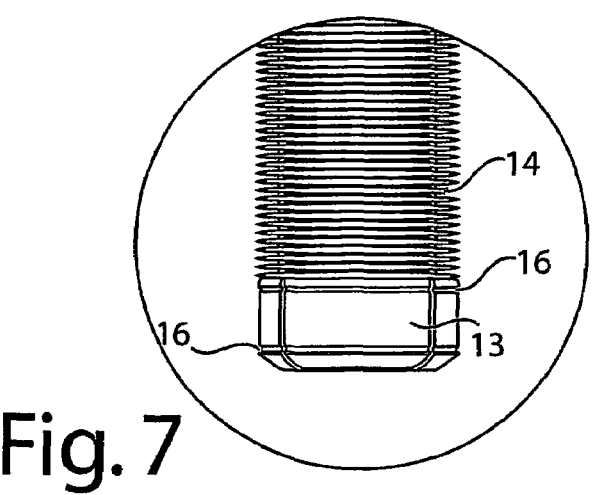
FIG. 7 shows the lower part of the compression piston of FIG. 5.

Coming now to describe FIGS. 5, 6 and 7, it is possible to note the piston for ejection of ice cream outside the containers 3, from top to the bottom. More particularly, piston 11 is comprised of an upper part 12 and of a lower part 13, between which a bellow 14 is provided, that can be filled in with air. Compressed air enters within the piston to expand the bellow, through the tube 15. While compressed air is introduced within the bellow 14 by the tube 15, the lower part 13 separates from the upper part 12, thus compressing the ice cream mass, provided under the lower part 13. Finally, circular housings are provided on the lower part 13, allowing the provision of O-rings.

Figure 8:
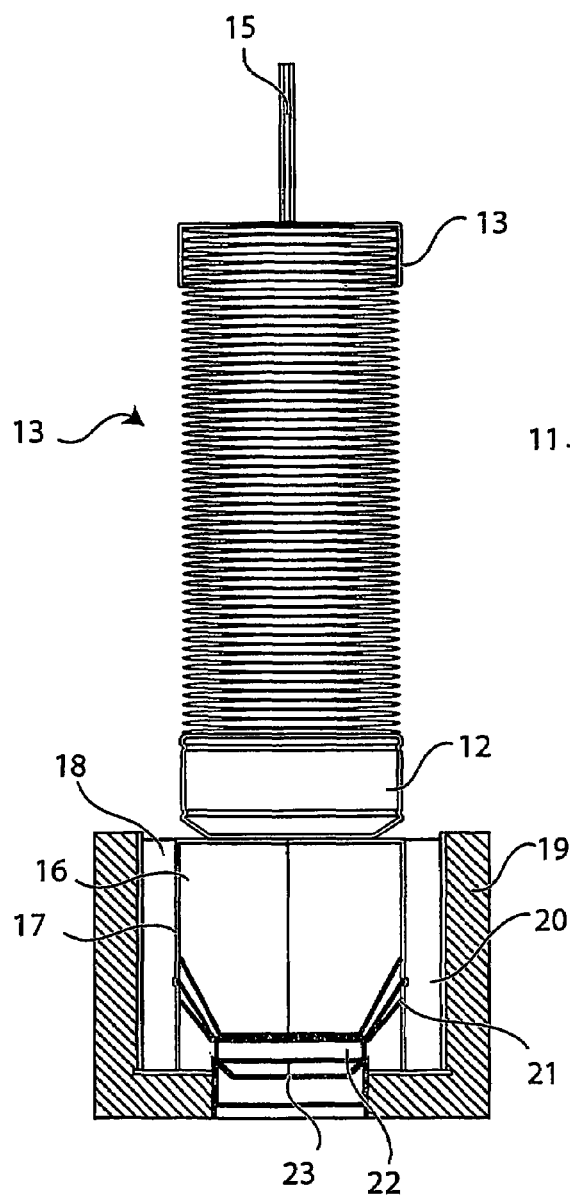
FIG. 8 shows a section lateral view of the assembly of the delivery means for the ice cream.
Figure 9:
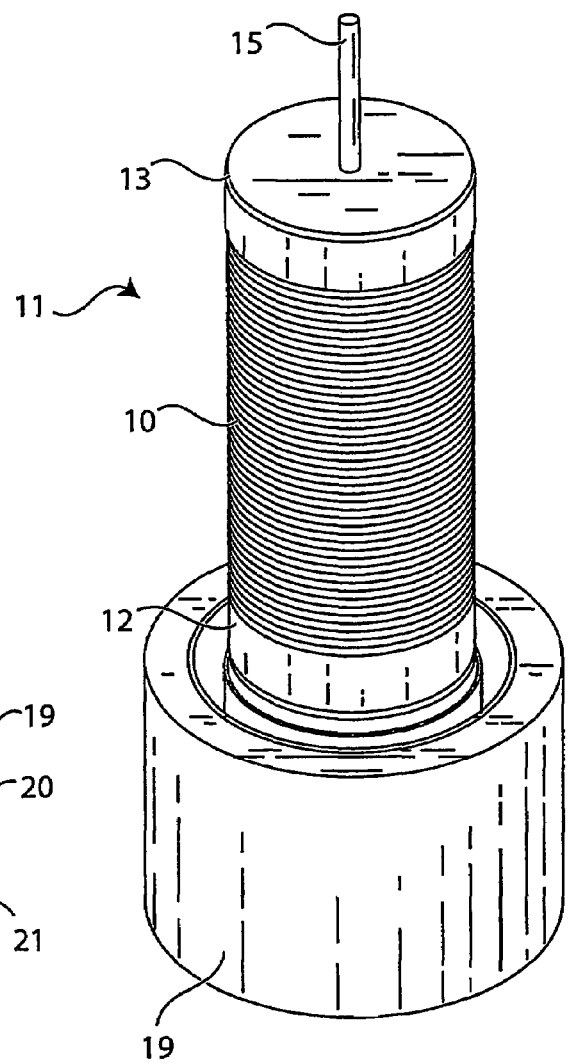
FIG. 9 shows a perspective view of the assembly of the delivery means for the ice cream.

In FIGS. 8, 9 and 10, operation of piston 11 is shown, to compress the ice cream mass and the means to which it is applied.

More specifically, ice cream mass 16, which is beforehand introduced within an hygienic film 17, it is provided within housing 18, surrounded by insulating walls 19 between the ice cream mass 16 and the insulating wall 19, glycol is provided within the interspace 20. Ice cream mass 16 is introduced within a device, comprised of a cone 21 and a portion delivering element 22, provided with an outlet mouth 23, through which the ice cream exits.

FIGS. 11a, 11b and 11c show in detail the portion delivering element 22, providing the outlet mouth 23, comprised of a plurality of fins 24, preferably made up of memory effect plastic material. These fins 24, due to the pressure of the ice cream mass 18 by the pushing action of the piston 11, expand outward, letting the ice cream pass. When the pressure thrust by the ice cream mass is terminated, fins 24 automatically retract, thanks to the property of the plastic materials to take again their original shape, thus closing the outlet. Thus, on the edges of the outlet of the portion delivering element 22 no residual of ice cream or other product remains.

Finally, FIGS. 12, 13 and 14 show the assembling of the various parts described with respect to the support structure 25 of the whole machine 1. Particularly, it is possible to observe the positioning of the upper panel 2 with respect to the containers 3 and to the cone or cups 26 distributor. An alphanumeric keyboard is provided in the upper part, to choose the ice cream tastes. In the lower part of the apparatus 1, the electric console 28, providing the feeding and programming devices, and the refrigerating group 29 are provided. In FIG. 14 it is shown the outer coating providing an opening 31 to take the product.

On the basis of the previous specification, it can be noted that the basic feature of the apparatus for automatic delivering of paste food products concerns the possibility of delivering in a very simple and quick way and at the same time maintaining a high quality hygiene standard, also because it is not contaminated from outside.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Apparatus for automatic delivering of paste food products, particularly ice cream and/or yoghurt, comprising a housing, within which a plurality of containers of said paste food products are provided, each one of said containers providing means for distributing said paste food products, and refrigeration means for said plurality of containers, and apparatus programming means, said apparatus being characterised in that said housing provides a rotating base, having at least one seat supporting a tray for receiving said paste food products from said plurality of containers, said rotating base moving in such a way to place said tray under one of said containers according to the sequence programmed by said programming means, said distribution means delivering said paste food products within said tray when it is in correspondence of the specific paste food product container wherein said refrigeration means comprise a refrigerator motor, a refrigeration coil provided inside the wall of said housing, and glycol provided inside said housing, in such a way to occupy the space between said paste material containers.

2. Apparatus according to claim 1, characterised in that said housing provides an insulating part, comprising an interspace, that can include said refrigeration coil.

3. Apparatus according to claim 1, characterised in that said containers of said paste food products are provided along the proximity of the edge of said container.

4. Apparatus according to claim 1, characterised in that it provides at least a reserve container, provided inside said housing.

5. Apparatus according to claim 1, characterised in that it provides at least a receiving tray distributor receiving the paste substance to be placed in at least one seat.

6. Apparatus according to claim 1, characterised in that said seat for said tray is substantially realised in correspondence of the outer edge of said rotating base.

7. Apparatus according to claim 1, characterised in that said tray is comprised of a con or of a cup.

8. Apparatus according to claim 1, characterised in that said tray is placed in correspondence of the paste product container in a position substantially decentred with respect to the outlet of the container since it is moved by pneumatic mechanical means.

9. Apparatus according to one of the preceding claim 1, characterised in that said paste food products delivering means, such as ice cream and/or yoghurt, comprise a piston, a body containing said paste food products and means for delivering said paste food products, said delivering means comprising a delivery mouth, said piston compressing the mass of said paste food products toward said delivery means, and said delivery means automatically opening said delivery mouth of said paste food products and automatically closing said mouth after the end of the compression of said piston on said paste food products.

10. Apparatus according to claim 9, characterised in that said piston comprises an upper wall, a lower wall and a bellow provided between said upper wall and said lower wall, said lower wall pushing said paste food products downward, and said piston can comprise a tube for flow of compressed air within said bellow, preferably through said upper wall.

11. Apparatus according to claim 9, characterised in that said housing has a cylindrical shape comprised of insulating material.

12. Apparatus according to claim 9, characterised in that said tube for flow of compressed air within said bellow passes through said housing.

13. Apparatus according to claim 9, characterised in that said delivery means comprise a substantially conical shaped nut and a portion delivering element, comprising said mouth, coupled at the lower base of said nut.

14. Apparatus according to claim 9, characterised in that said mouth provides a plurality of tabs, said tabs remaining open during the delivery of said paste food product, and retracting after the end of the pressure of said paste food products, thus closing said mouth.

15. Apparatus according to claim 9, characterised in that said mouth is comprised of plastic material with memory effect.

16. Apparatus according to claim 9, characterised in that said paste food product delivery means comprise an envelope for packaging said paste food products, such as a film, preferably a polypropylene or polyethylene film.

* * * * *